United States Patent
Derrick et al.

(10) Patent No.: US 6,793,237 B2
(45) Date of Patent: Sep. 21, 2004

(54) ASSEMBLY UNIT INCLUDING AN AIRBAG MODULE

(75) Inventors: John-Oliver Derrick, Hettstadt (DE); Volker Schuhmacher, Schmelz (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 139 days.

(21) Appl. No.: 10/278,622

(22) Filed: Oct. 23, 2002

(65) Prior Publication Data

US 2003/0075905 A1 Apr. 24, 2003

(30) Foreign Application Priority Data

Oct. 23, 2001 (DE) .................................. 201 17 140 U

(51) Int. Cl.⁷ ........................ B60R 21/20; F16B 21/06
(52) U.S. Cl. .................. 280/728.2; 280/731; 411/347; 24/453; 24/573.11
(58) Field of Search ............................ 280/728.2, 731; 200/61.54, 61.55; 411/347, 509; 24/453, 573.11, 581.1

(56) References Cited

U.S. PATENT DOCUMENTS 5,584,501 A  12/1996  Walters
2001/0011815 A1  8/2001  Ikeda et al.
2002/0043786 A1  4/2002  Schutz
2002/0074781 A1  6/2002  Schutz et al.

FOREIGN PATENT DOCUMENTS

| DE | 20017527 | 3/2001 | |
|----|----------|--------|---|
| DE | 20021532 | 5/2001 | |
| EP | 0558866 | 9/1993 | |
| FR | 2790044 | 8/2000 | |
| JP | 2001151065 A | * 6/2001 | .......... B60R/21/20 |
| JP | 2001163146 A | * 6/2001 | .......... B60R/21/16 |

* cited by examiner

Primary Examiner—Peter C. English
(74) Attorney, Agent, or Firm—Tarolli, Sundheim, Covell & Tummino L.L.P.

(57) ABSTRACT

An assembly unit comprises an airbag module, a vehicle part, in particular a steering wheel, and a removable latching connection for attaching the airbag module to the vehicle part. The latching device has a journal provided with a recess and a locking element that can be moved crosswise, preferably perpendicular, to a longitudinal axis of the journal. The locking element is radially displaced towards the longitudinal axis of the journal when it latches in place in the recess. In the locked position, the locking element is pre-stressed towards a release position so as to move out of the recess.

10 Claims, 1 Drawing Sheet

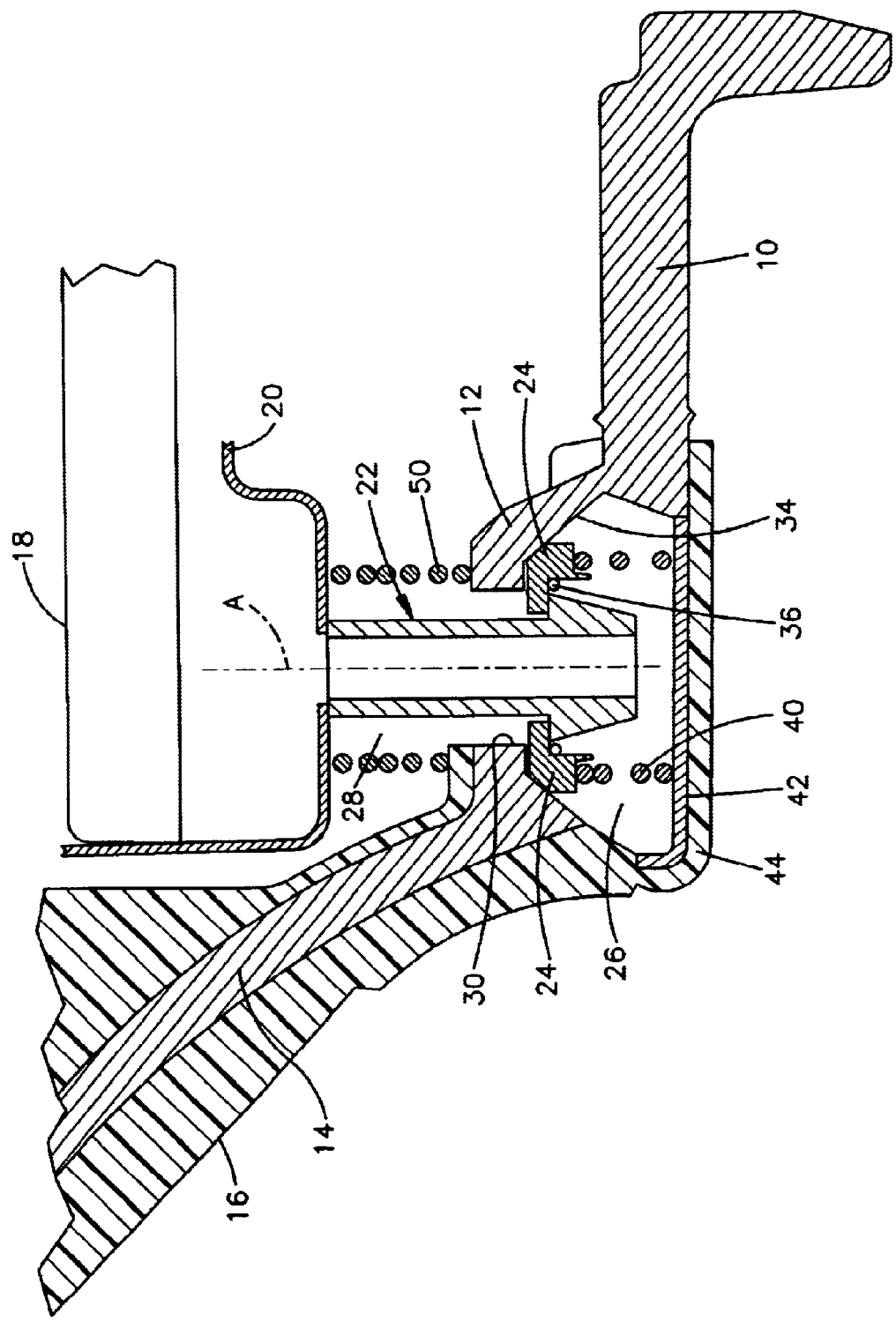

ASSEMBLY UNIT INCLUDING AN AIRBAG MODULE

TECHNICAL FIELD

The invention relates to an assembly unit including an airbag module and a vehicle part.

BACKGROUND OF THE INVENTION

A conventional assembly unit such as mentioned above usually comprises a latching device including a locking element for connecting the module to the vehicle part. In existing assembly units having an airbag module that is attached by means of the latching device to a vehicle part such as, for example, the steering wheel, the locking element is prestressed towards the locked position in that either the locking element itself is a spring or else it is pushed into the locked position by an elastic element. For purposes of dismantling, a tool has to be inserted so as to push the locking element into the release position.

BRIEF SUMMARY OF THE INVENTION

The invention creates an assembly unit with which the dismantling is facilitated. According to the invention, an assembly unit comprises an airbag module, a vehicle part, in particular a steering wheel, and a removable latching connection for attaching the airbag module to the vehicle part. The latching device has a trunnion provided with a recess and a locking element that can be moved crosswise, preferably perpendicular, to a longitudinal axis of the trunnion. The locking element is radially displaced towards the longitudinal axis of the trunnion when it latches in place in the recess. In the locked position, the locking element is prestressed towards a release position so as to move in a direction out of the recess, i.e. away from the trunnion. This can be made possible, for example, in that the locking element itself has an elastic section which causes it to strive to move out of the locking position or in that there is another elastic element that pushes against the locking element and strives to move it into the release position for the trunnion. Until now, the displacement movement of the locking element was effectuated exclusively by the tool, whereas with the assembly unit according to the invention, the unlocking is at least assisted by the prestressing.

In order for the locking element in the locked position not to be moved into the release position by the prestressing force exerted on it, there is preferably a lateral delimitation for the locking element that acts in the locked position and that prevents the locking element from being displaced towards the release position while in the locked position. This lateral delimitation is preferably formed by a wall limiting an opening, the trunnion being inserted into the opening and the opening widening to such an extent that, after a defined displacement of the trunnion and of the locking element, the locking element can be displaced into the release position for the trunnion by the prestressing force provided.

The opening is conically tapered as provided according to an embodiment.

Moreover, an additional elastic means may be provided that, in the locked position, exerts a force on the locking element which is greater than the prestressing force that acts in the release direction and which counteracts the latter. The elastic means is preferably a spring.

For purposes of dismantling, according to one embodiment, the invention provides that a support part engages the elastic means that acts opposite to the release direction. The support part is removably accommodated in the assembly unit and, after it has been removed, the force exerted by the elastic means acts on the locking element in the direction towards the locked position is less than the prestressing force in the release position, so that the locking element moves into the release position without the use of a tool.

Additional features and advantages of the invention will be apparent from the description below of a preferred embodiment.

BRIEF DESCRIPTION OF THE DRAWING

The FIGURE shows a cross-sectional view through an assembly unit according to the invention with an airbag module and a steering wheel, the section shown in the FIGURE being taken along the spokes and the steering wheel hub.

DETAILED DESCRIPTION OF THE PREFERRED EMBODIMENT

The FIGURE shows half of the steering wheel hub 10 that is part of the steering wheel skeleton and that, in the area of a step 12, makes a transition to spokes 14. The reference numeral 16 designates the foam covering of the steering wheel skeleton. The area described so far is called the steering wheel. An airbag module is attached to the steering wheel as a so-called "floating-horn" module. The airbag module has a housing 18 in which an airbag with a gas generator is accommodated. The housing 18 is attached to a gas generator carrier 20 on the rear side of which a slit bushing, hereinafter called journal 22, is attached. All in all, there are provided several such journals 22 with which the airbag module is attached to the steering wheel.

The journals 22 are part of a latching device with which the airbag module is attached to the steering wheel, the latter constituting a vehicle part. The latching device comprises two circular-segment and jaw-shaped locking elements 24 that are accommodated in a cavity 26 under the step 12. In the locked position shown in the FIGURE, the two semi-circular locking elements are in contact with each other, so that they cannot be moved any further radially towards each other. Each journal 22 has a recess 28 in the form of an undercut in which the locking elements 24 latch in place as soon as the module is inserted from the top, in the direction of the longitudinal axis A of the journal, into the opening 30 of the skeleton. The locking elements 24 can be moved radially, that is to say, at a right angle to the axis A, towards each other into the locked position and away from each other into the release position.

The opening 30 widens in downward direction so as to create the cavity 26. The wall, which extends conically upwards, is designated with the reference numeral 34. The two locking elements 24 have a corresponding conical mating surface so that they can slide along the conical wall 34. When the movement is made upwards, the locking elements move radially towards each other and vice versa.

The two locking elements 24 are linked by a release spring 36, which strives to push the locking elements radially outwards away from each other so that they reach the release position in which the journal 22 can be pulled upwards out of the opening 30. In the locked position shown in the Figure, the release spring 36 exerts a prestressing force, which is directed outwards, on the locking elements 24.

In the locked position and in the operation of the assembly unit, however, the locking elements 24 cannot move radially away from each other into the release position, since a further elastic device in the form of a lock spring 40 engages the bottom of the locking elements 24 and pushes them deeper into the cone and thus towards each other until the locking elements touch each other. The radially inwardly directed force, which is exerted on the locking elements 24 via the wall 34 that acts as the lateral delimitation, is greater than the prestressing force that is exerted in the opposite direction from the release spring 36.

The lock spring 40 is located on a thick support part 42 that lies on the bottom of the cavity 26 in order to rest thereon. A pivoting flap 44, in turn, forms the bottom of the cavity 26. When the support part 42 is removed, for example, after the flap 44 is opened, then the force exerted by the lock spring 40 on the locking elements 24 is less than the prestressing force exerted by the release spring 36. Now the module just has to be pushed slightly downwards and the locking elements 24 move away from each other of their own accord into the release position, so that the module can be taken out to the top, without the use of a tool. As an alternative, the flap 44 can be left out so that, for example, the foam covering 16 forms an integral piece of the bottom of the cavity 26. In this case, the support part 42 can be pulled out, for example, out of the drawing plane, so that the pre-stressing force of the lock spring 40 is reduced or so that the support for the lock spring 40 is eliminated.

The locking elements 24 also form a kind of sliding bearing for the trunnions 22. Due to the conical wall 34, the bearing—here the locking elements 24 and the steering wheel skeleton—are always centered free of play. Between the trunnions 22 and their bearings, that is to say, the locking elements 24, there only has to be a small radial gap, which is sufficient to allow an axial displacement of the steering wheel module.

This axial displacement takes place when the horn is activated. For this purpose, the entire airbag module is pushed in the axial direction—downwards relative to the Figure—against a so-called return spring 50 between the skeleton and the carrier plate 20, until the horn contacts touch each other. After the driver lets go of the module, the return spring 50 brings the module back to its starting position.

The alignment of the module with respect to the steering wheel is also facilitated in that the trunnions 22 engage a respective opening 30 directly in the skeleton and they do not, as is common in some of the state of the art, engage intermediate plates that are mounted indirectly on the skeleton.

What is claimed is:

1. An assembly unit, comprising:
   an airbag module,
   a vehicle part, and
   a removable latching connection for attaching said airbag module to said vehicle part,
   said latching connection having a trunnion provided with a recess and a locking element that can be moved crosswise to a longitudinal axis of said trunnion, said locking element being radially displaced towards said longitudinal axis of said trunnion when it latches in place in said recess in a locked position,
   the improvement consisting in that, in said locked position, said locking element is prestressed towards a release position so as to move in a direction out of said recess.

2. The assembly unit according to claim 1, wherein a release spring provides a prestressing force that strives to push said locking element radially outwards.

3. The assembly unit according to claim 2, wherein said vehicle part has a lateral delimitation for said locking element, said lateral delimitation preventing in said locked position a displacement of said locking element towards said release position.

4. The assembly unit according to claim 3, wherein said lateral delimitation is a wall limiting an opening into which said trunnion is inserted, said opening widening radially to such an extent that, after a defined displacement of said trunnion and of said locking element, said locking element is displaced towards said release position by means of said prestressing force.

5. The assembly unit according to claim 4, wherein said opening is conical.

6. The assembly unit according to claim 5, wherein said locking element has a mating conical surface which lies against said wall of said conical opening.

7. The assembly unit according to claim 5, wherein several locking elements, which each have a circular-segment shape, are provided for locking said trunnion, said locking elements being prestressed radially in a release direction by said release spring that generates said prestressing force.

8. The assembly unit according to claim 4, wherein an elastic element is provided that, in said locked position, exerts a force on said locking element which is greater than said prestressing force and which counteracts the prestressing force.

9. The assembly unit according to claim 8, wherein said elastic element strives to push said locking element deeper into a narrowing section of said opening.

10. The assembly unit according to claim 8, wherein a support part is provided which is engaged by said elastic element and is removably accommodated in said assembly unit, and, after said support part has been removed, said force exerted by said elastic element on said locking element being less than said prestressing force.

* * * * *